W. R. HUME.
MEANS FOR JOINING THE ABUTTING ENDS OF PIPES.
APPLICATION FILED AUG. 21, 1920.
1,357,870.
Patented Nov. 2, 1920.
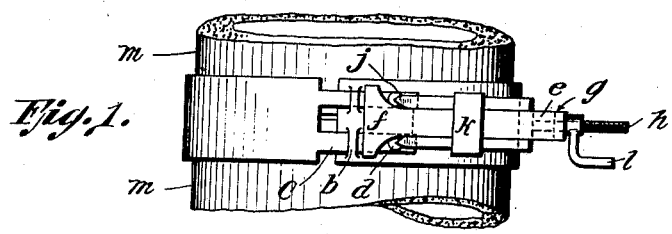
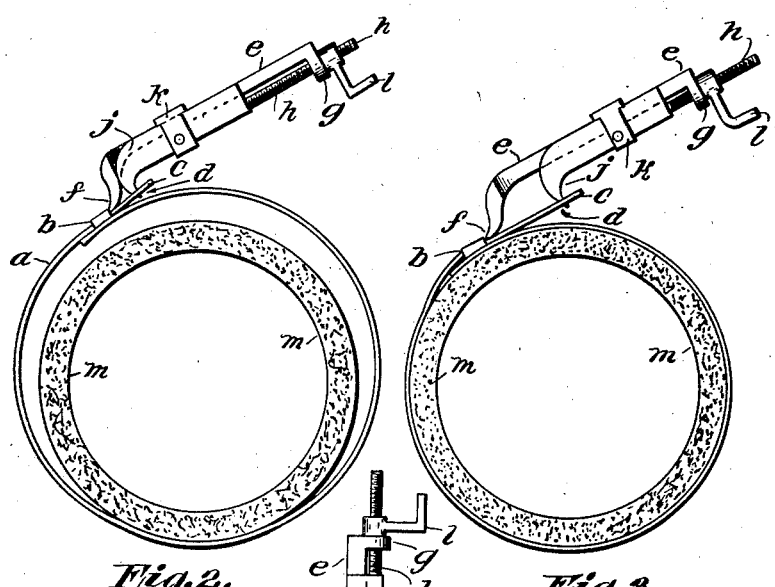
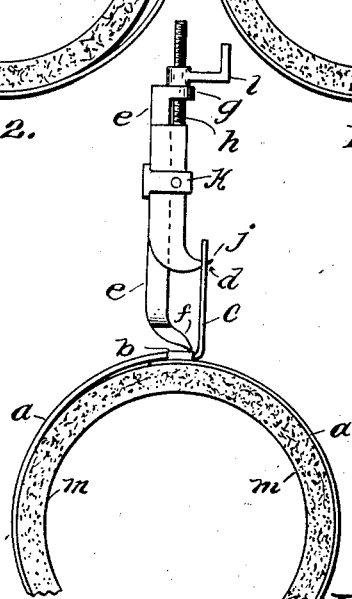
Fig. 4.
Inventor:
W. R. Hume,
By H. R. Kerslake,
Attorney

UNITED STATES PATENT OFFICE.

WALTER REGINALD HUME, OF MARIEYRNONG, VICTORIA, AUSTRALIA.

MEANS FOR JOINING THE ABUTTING ENDS OF PIPES.

1,357,870.  Specification of Letters Patent.  Patented Nov. 2, 1920.

Application filed August 21, 1920. Serial No. 405,111.

*To all whom it may concern:*

Be it known that I, WALTER REGINALD HUME, a subject of His Majesty the King of Great Britain, residing at Vanness avenue, Marieyrnong, in the State of Victoria, Commonwealth of Australia, have invented certain new and useful Improvements in Methods of and Means for Joining the Abutting Ends of Concrete Pipes and other Pipes, of which the following is a specification.

My invention relates to means for joining the abutting ends of concrete and other pipes, the object of the invention being to provide means whereby such pipes may be drawn together and held in close proximity to each other, the joint being either of a temporary or permanent character according to requirements.

In order to achieve the object of my invention I bring the pipe ends into close contact with each other and surround them with a metal band provided with tongues which pass through sockets, the arrangement being such that the tongues can be gripped by a tool and drawn tight after which they are bent or cleated over, the band having meanwhile drawn the pipe-ends into exact alinement with each other where they may be retained by the band without further attachment or, if so desired, the joint can be additionally secured by any suitable means.

In order that my invention may be clearly understood I will now describe the same by aid of the accompanying illustrative drawings wherein—

Figure 1 is a plan showing the joining band and tool applied to the abutting ends of adjacent pipes.

Figs. 2, 3 and 4 are sectional views of the pipes showing the band in progressive positions of attachment and the tool for carrying the operations into effect.

In each of the illustrations similar letters of reference are used to denote similar or corresponding parts, wherever they occur.

In the drawings $a$ is a collar or band of suitable width and thickness and preferably made of sheet metal such as galvanized iron, the length of the band being a little in excess of the external circumference of the abutting pipe ends to which it is applied.

In one end of the band one or more openings are cut by forming two short parallel incisions, the intervening metal being pressed outward so as to form a socket or sockets $b$ through which one or more suitably cut tongues $c$ which project from the opposite end of the band may be passed and are subsequently drawn tight and cleated over. The tongues above referred to constitute a continuation of the body of the band and are either an integral portion thereof or may be attached thereto and are cut to a width capable of passing through the sockets in the opposite end. These tongues are provided with holes or slots $d$ which are engaged by a tightening tool.

The adjustment tool which is used for drawing the band ends together consists of a strong body portion $e$ preferably made of steel, one end of which is provided with a downwardly deflected outwardly projecting edge $f$ which when applied to practical use abuts against and engages the outpressed portion of the band which forms the socket for the tongue above referred to. The opposite end of the body is likewise downwardly deflected at $g$ and is furnished with a hole for the reception of a shank screw $h$ which is attached to or integral with a traversing claw $j$, and intermediate guide $k$ being provided for steadying and retaining the traveling portion.

The shank of the claw piece which protrudes through the hole or opening in the deflected portion $g$ is furnished with a winding key or handle $l$ constituting a screw-threaded nut.

The opposite end of the traveling element is provided with one or more hook-line constructions or claws, the hooks or claws being bent in the opposite direction to the edge of the tool previously described and being adapted to be inserted in the holes or slots in the tongue portions of the band.

In applying my invention to practical use, the pipes which I have indicated in the drawings by the reference letter $m$ are brought together so that their ends lie in close proximity to each other and are approximately even in circumferential alinement. The band is then placed around the pipe ends as in Fig. 3 and is evenly or centrally spaced so that half of the band in width lies over each pipe end. When this has been done the tongues are passed through the corresponding sockets and the downwardly deflected outwardly projecting edge of the tool is pressed against the projecting socket portion of the band, after which the hooks or claws of the moving portion of the tool are inserted into the holes or slots of the tongue. By means of the winding key or handle the screw-threaded shank is caused to traverse rearwardly carrying the claw portion in the same direction so that as the tongues are operated upon by the claws, the ends of the band will be drawn tightly together and the band will consequently closely surround the pipe ends as will be well understood upon reference to Fig. 4 of the drawings.

When sufficient tension has been exerted upon the bands, the tool is turned upward and backward, as in Fig. 4 of the drawings, thus carrying the tongues with it so that by the bending movement it cleats or locks the tongues upon the socket portion of the band. The tongues are finally and completely cleated with the aid of a hammer or other tool.

The foregoing specification describes the method of and means for giving effect to my invention but if so desired the joint can further be secured by any suitable means.

Having now fully described and ascertained my said invention, and the manner in which it is to be performed, I declare that what I claim is:—

Means for joining the ends of pipes comprising a split metal band adapted to pass around the ends of the pipes, said band being provided at one end with transversely alined pairs of incisions and the metal between the incisions of each pair being extended outwardly to form sockets having shoulders, the shoulders of the sockets being transversely alined and designed to act as abutments for a tightening tool, and tongues provided at the other end of the band, extending through said sockets and bent backwardly over said shoulders to hold the band in place, said tongues being apertured to receive parts of a stretching tool.

In testimony whereof I affix my signature.

WALTER REGINALD HUME.